United States Patent
Jikihara et al.

(10) Patent No.: US 7,141,638 B2
(45) Date of Patent: Nov. 28, 2006

(54) VINYL ALCOHOL POLYMER

(75) Inventors: Atsushi Jikihara, Okayama-Pref. (JP); Naoki Fujiwara, Osaka (JP)

(73) Assignee: Kuraray Co., Ltd., Kurashiki (JP)

( * ) Notice: Subject to any disclaimer, the term of this patent is extended or adjusted under 35 U.S.C. 154(b) by 158 days.

(21) Appl. No.: 10/895,971

(22) Filed: Jul. 22, 2004

(65) Prior Publication Data
US 2005/0025913 A1 Feb. 3, 2005

(30) Foreign Application Priority Data
Jul. 22, 2003 (JP) .............................. 2003-277792

(51) Int. Cl.
*C08F 212/00* (2006.01)
(52) U.S. Cl. .................... 526/307.5; 526/332
(58) Field of Classification Search ............. 526/307.5, 526/332
See application file for complete search history.

(56) References Cited

U.S. PATENT DOCUMENTS

| | | | |
|---|---|---|---|
| 5,190,712 A * | 3/1993 | Oishi et al. ............ | 264/211.23 |
| 6,403,198 B1 | 6/2002 | Urasaki | |
| 2002/0176970 A1 | 11/2002 | Kobayashi et al. | |

FOREIGN PATENT DOCUMENTS

| | | |
|---|---|---|
| DE | 40 41 737 A1 | 7/1991 |
| JP | 61-47878 | 3/1986 |
| JP | 3-203932 | 9/1991 |
| JP | 4-182189 | 6/1992 |
| JP | 6-136036 | 5/1994 |
| JP | 6-256533 | 9/1994 |
| JP | 7-137434 | 5/1995 |
| JP | 11-1505 | 1/1999 |
| JP | 11-322866 | 11/1999 |
| JP | 2001-150805 | 6/2001 |
| JP | 2001-342320 | * 12/2001 |

* cited by examiner

*Primary Examiner*—Ling-Sui Choi
(74) *Attorney, Agent, or Firm*—Oblon, Spivak, McClelland, Maier & Neustadt, P.C.

(57) ABSTRACT

A vinyl alcohol polymer is provided that is particularly useful for efficiently producing an inkjet recording material having an ink-receiving layer which is not cracked on its surface, which is highly glossy, which can absorb ink well and which is highly transparent, wherein the vinyl alcohol polymer has specific polyoxyalkylene group-containing monomer units and where the product of the viscosity-average degree of polymerization, P, of the vinyl alcohol polymer and the content, S (mol %), of polyoxyalkylene group-containing monomer units, P×S, and the number, n, of the oxyalkylene repeating units in the polyoxyalkylene group-containing monomer unit satisfy specific relational formulae.

20 Claims, No Drawings

VINYL ALCOHOL POLYMER

BACKGROUND OF THE INVENTION

1. Field of the Invention

The present invention relates to a vinyl alcohol polymer, a method for producing the vinyl alcohol polymer, a coating agent that contains the vinyl alcohol polymer, and a coated article, such as an inkjet recording material, produced by applying the coating agent to a substrate.

2. Discussion of the Background

Vinyl alcohol-based polymers (typically referred to as vinyl alcohol polymers) (hereinafter vinyl alcohol polymer may be abbreviated as PVA) are known as water-soluble synthetic polymers, and are used as a raw material for synthetic fiber vinylon based on its strength property. In addition, they are used for paper processing agents, textile sizing agents, dispersants, adhesives, films and others, based on their excellent film-forming ability, surface activity and hydrogen bond-forming ability. Especially in the field of paper processing applications, vinyl alcohol polymers are used for improving the quality of printed matter, for example, as a surface-sizing agent for printing and writing paper; an under-sizing agent for artificial paper and coated paper; fluorescent dye dispersant; and as a filler binder for ink-jet recording materials.

Recently, inkjet printers have grown in popularity, and inkjet recording materials are used for color proofs in commercial printing, for design image outputting in the field of designing, and for sheets for over-head projectors. The demand characteristics of the inkjet recording materials for those applications are that the surface of the ink-receiving layer thereof is highly glossy, the ink-receiving layer thereof is highly transparent, the image density on these is high, their color reproducibility is good, their ink absorbability is good, and their dot reproducibility is good.

With respect to the above-mentioned characteristics for such inkjet recording materials, a recording material is known, which has, as an ink-receiving layer, a microporous layer comprising inorganic fine particles and a hydrophilic binder (JP-A 7-137434). The recording material attains both good ink absorbability and good waterproofness owing to its capillary based ink-absorbing mechanism. However, in order to form capillaries in the ink-receiving layer, in general, the layer must contain a large amount of fine particles relative to the amount of binder contained. In such a case, the ratio of binder to fine particles in the ink-receiving layer is low and therefore the layer is extremely stiff and hard. Accordingly, when a coating liquid that comprises inorganic fine particles and a hydrophilic binder is applied to a substrate to form an ink-receiving layer, internal stresses may occur when the coating layer is dried, or fine impurities may enter the layer and, as a result, the ink-receiving layer has the problem that it can be readily cracked.

To solve this problem of cracking of the coating layer, a method of thickening the coating layer before it is dried may be employed. One such method has been proposed, which comprises using a coating liquid prepared by adding boric acid as a curing agent to a polyvinyl alcohol having a high degree of polymerization, and cooling the coating layer formed from the liquid to 20° C. or lower (JP-A2001-150805). When the coating layer is cooled to 20° C. or lower in the method of JP '805, supposedly a stiff three-dimensional structure may be formed therein owing to the interaction between the polyvinyl alcohol and boric acid, and, as a result, cracking of the layer may be prevented. In this method, however, the coating layer must be cooled after it has been formed, and the energy loss in the process is great. Therefore, the method is problematic in that formation of the coating film takes a lot of time and the production speed could not be readily increased. In addition, in the method, the viscosity of the coating liquid is high since polyvinyl alcohol having a high degree of polymerization is used, and the concentration of the coating liquid must be kept low, in view of the desired handlability thereof. Accordingly, the method has another problem in that the film-drying operation takes a lot of time and the production speed could not be readily increased.

For controlling the viscosity of a coating liquid that comprises a vinyl alcohol polymer, another method of using a modified polyvinyl alcohol may be taken into consideration in addition to the above-mentioned method of adding a reactive additive to polyvinyl alcohol. There are not so many trials using a modified polyvinyl alcohol for controlling the solution viscosity behavior of polyvinyl alcohol relative to temperature change. For a polyvinyl alcohol that is responsive to heat in the form of its aqueous solution, block copolymers and graft copolymers are known, that comprise a polyvinyl alcohol component and a polyalkenyl ether component, wherein the aqueous solution shows a clouding point. A block copolymer that comprises polyvinyl alcohol and poly(2-methoxyethyl vinyl ether) has been described. The temperature dependency of the viscosity of the aqueous solution of the block copolymer within a temperature range of from 40 to 90° C. is lower than that of polyvinyl alcohol (JP-A 6-136036). A graft copolymer that comprises polyvinyl alcohol as the stem component and poly(2-methoxyethyl vinyl ether) as the branch component has also been described. The viscosity of the aqueous solution of the graft copolymer increases and the aqueous solution becomes cloudy at temperatures around the clouding point of the aqueous solution of each polymer of the stem component and the branch component of the graft copolymer (JP-A 11-322866).

One typical example of a vinyl alcohol polymer that has a polyether component and is known in the art is a saponified product of a random copolymer obtained through copolymerization of a polyoxyalkylene group-containing monomer and a vinyl ester monomer, in which the polyoxyalkylene group is essentially a polyoxyethylene or polyoxypropylene group. Based on the hydrophobic property of the polyoxypropylene group contained therein, a polyoxypropylene group-containing vinyl alcohol polymer may be used as a dispersing stabilizer which is suitable for suspension polymerization, emulsion polymerization or postemulsification (JP-A11-1505, corresponding to U.S. Pat. No. 6,107,426); as a textile sizing agent to which the amount of the oil to be added may be small (JP-A61-47878); as a composition effective for preventing paper from adhering to a blanket in offset printing (JP-A 2001-342320); and as a dispersant for heat-sensitive dyes to give thermal recording materials that have a high degree of whiteness (JP-A 4-182189). Based on the flexibility of polyoxypropylene group-containing polyvinyl alcohol, there has been developed a melt-molding method for polyvinyl alcohol containing no added plasticizer (JP-A 3-203932, corresponding U.S. Pat. No. 5,190,712); and a method of producing polyvinyl alcohol moldings that comprises contacting a polyoxypropylene group-containing polyvinyl alcohol with a boron compound, followed by melt-molding the resulting mixture (JP-A 6-256533).

However, these approaches disclose nothing about the thermal responsiveness of an aqueous solution of a polyoxypropylene group-containing vinyl alcohol polymer, and no one has heretofore made successful efforts to control the viscosity behavior, relative to temperature change, of an aqueous solution of a polyoxypropylene group-containing vinyl alcohol polymer by controlling the amount of the polyoxypropylene group in the polymer and controlling the number of the oxypropylene repeating units in the polyoxypropylene group.

SUMMARY OF THE INVENTION

Accordingly, one object of the present invention is to provide a vinyl alcohol polymer useful for efficiently producing an inkjet recording material having an ink-receiving layer which is not cracked on its surface, which is highly glossy, which can absorb ink well and which is highly transparent.

Another object of the invention is to provide a method for producing the vinyl alcohol polymer.

A further object of the present invention is to provide a coating agent that contains the vinyl alcohol polymer.

Another object of the invention is to provide a coated article, such as an inkjet recording material, produced by applying the coating agent to a substrate.

These and other objects of the present invention, either individually or in combinations thereof, have been satisfied by the discovery of a vinyl alcohol polymer comprising units from a polyoxyalkylene group-containing monomer of the following formula (I):

(I)

wherein $R^1$ represents an alkyl group having 1 or 2 carbon atoms; $R^2$ represents a hydrogen atom, or an alkyl group having from 1 to 4 carbon atoms, wherein:

when the viscosity of an aqueous 8 wt. % solution of the vinyl alcohol polymer is measured with a BL-type viscometer at a rotor speed of 60 rpm, the ratio of a viscosity $\eta 1$ thereof at 60° C. to a viscosity $\eta 2$ thereof at 40° C., $\eta 1/\eta 2$, is at least 0.8;

when $R^2$ is a hydrogen atom, then a product of the viscosity-average degree of polymerization, P, of the vinyl alcohol polymer and a content, S (mol %), of polyoxyalkylene group-containing monomer units, relative to all monomer units, of the vinyl alcohol polymer, P×S, and a number n of oxyalkylene repeating units in the polyoxyalkylene group-containing monomer unit satisfies the following numerical formulae (1) to (4):

$n > -0.047 P \times S + 25$ (1), $n < -0.044 P \times S + 58$ (2), $P \times S > 5$ (3), $15 < n \leq 50$ (4);

when $R^2$ is an alkyl group having from 1 to 4 carbon atoms, then the number n of oxyalkylene repeating units in the polyoxyalkylene group-containing monomer unit satisfies the following numerical formula (5):

$1 \leq n \leq 100$ (5), a method for its production, a coating agent containing the vinyl alcohol polymer and a coated article, such as an inkjet recording material, produced with the coating agent.

DETAILED DESCRIPTION OF THE PREFERRED EMBODIMENTS

The present invention relates to a vinyl alcohol polymer comprising units from a polyoxyalkylene group-containing monomer of the following formula (I):

(I)

wherein $R^1$ represents an alkyl group having 1 or 2 carbon atoms; $R^2$ represents a hydrogen atom, or an alkyl group having from 1 to 4 carbon atoms, wherein:

when the viscosity of an aqueous 8 wt. % solution of the vinyl alcohol polymer is measured with a BL-type viscometer at a rotor speed of 60 rpm, the ratio of a viscosity $\eta 1$ thereof at 60° C. to a viscosity $\eta 2$ thereof at 40° C., $\eta 1/\eta 2$, is at least 0.8;

when $R^2$ is a hydrogen atom, then a product of the viscosity-average degree of polymerization, P, of the vinyl alcohol polymer and a content, S (mol %), of polyoxyalkylene group-containing monomer units, relative to all monomer units, of the vinyl alcohol polymer, P×S, and a number n of oxyalkylene repeating units in the polyoxyalkylene group-containing monomer unit satisfies the following numerical formulae (1) to (4):

$n > -0.047 P \times S + 25$ (1), $n < -0.044 P \times S + 58$ (2), $P \times S > 5$ (3), $15 < n \leq 50$ (4);

when R 2 is an alkyl group having from 1 to 4 carbon atoms, then the number n of oxyalkylene repeating units in the polyoxyalkylene group-containing monomer unit satisfies the following numerical formula (5):

$1 \leq n \leq 100$ (5).

In addition, the invention includes a method for producing the vinyl alcohol polymer, a coating agent that contains the vinyl alcohol polymer, and a coated article such as an ink-jet recording material produced by applying the coating agent to a substrate.

The vinyl alcohol polymer of the invention is characterized in that, when an aqueous solution of the polymer is heated up to a temperature not lower than room temperature, the viscosity is higher than that of ordinary polyvinyl alcohol. Accordingly, when the coating agent that contains the vinyl alcohol polymer of the invention is applied onto a substrate and the coating layer formed is heated and dried, then the viscosity of the coating layer increases before the layer is dried, thus prevented the layer from being cracked. In addition, when the vinyl alcohol polymer of the invention is used as a coating agent in preparation of an inkjet recording material having an ink-receiving layer, the inkjet recording material layer can be produced efficiently and has an ink-receiving layer that is glossy and transparent and absorbs ink well.

The vinyl alcohol polymer of the invention comprises polyoxyalkylene group-containing monomer units of formula (I)

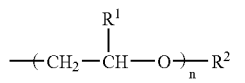

(I)

and is characterized in that, when the viscosity of an aqueous 8 wt. % solution of the vinyl alcohol polymer is measured with a BL-type viscometer at a rotor speed of 60 rpm, the ratio of the viscosity η1 thereof at 60° C. to the viscosity η2 thereof at 40° C., η1/η2, is at least 0.8. When the vinyl alcohol polymer is used in a coating agent, it gives coated articles having good physical properties, particularly in avoiding cracking of the coating layer. Preferably, the viscosity ratio η1/η2 is at least 1, more preferably at least 1.5, even more preferably at least 1.8, and most preferably at least 2.

$R^1$ in the above-noted formula (I) is preferably a methyl group. $R^2$ in formula (I) is preferably a hydrogen atom, a methyl group or a butyl group, more preferably a hydrogen atom or a methyl group. Even more preferably, in formula (I), $R^1$ is a methyl group and $R^2$ is a hydrogen atom or a methyl group.

When $R^2$ in formula (I) is a hydrogen atom, then the product of the viscosity-average degree of polymerization, P, of the vinyl alcohol polymer and the content, S (mol %), of the polyoxyalkylene group-containing monomer units, relative to all monomer units, of the vinyl alcohol polymer, P×S, and the number, n, of the oxyalkylene repeating units in the polyoxyalkylene group-containing monomer unit (n is an average number of oxyalkylene repeat units for the polyoxyalkylene group-containing monomer units) must satisfy the following numerical formulae (1) to (4):

$$n > -0.047 P \times S + 25 \quad (1),$$

$$n < -0.044 P \times S + 58 \quad (2),$$

$$P \times S > 5 \quad (3),$$

$$15 < n \leq 50 \quad (4).$$

If the numerical formula (1) or the numerical formula (3) is not satisfied, then the ratio of the viscosity η1 at 60° C. to the viscosity η2 at 40° C., η1/η2 will be smaller than 0.8. If the numerical formula (2) is not satisfied, then the aqueous vinyl alcohol polymer solution may have a clouding point, or may readily undergo phase separation, or the vinyl alcohol polymer may be insoluble in water, and, as a result, the aqueous vinyl alcohol polymer solution will be difficult to handle or produce.

The number, n, of the oxyalkylene repeating units in the polyoxyalkylene group-containing monomer unit preferably satisfies 20<n<40. If n is 15 or less, then the ratio of the viscosity η1 at 60° C. to the viscosity η2 at 40° C., η1/η2 will be smaller than 0.8. If n is larger than 50, then the aqueous vinyl alcohol polymer solution may have a clouding point or may readily undergo phase separation, and the aqueous vinyl alcohol polymer solution will be therefore difficult to handle or produce.

When $R^2$ in formula (I) is an alkyl group having from 1 to 4 carbon atoms, then the number, n, of the oxyalkylene repeating units in the polyoxyalkylene group-containing monomer unit must satisfy the following numerical formula (5):

$$1 \leq n \leq 100 \quad (5).$$

Further, it is desirable that the product of the viscosity-average degree of polymerization, P, of the vinyl alcohol polymer and the content, S (mol %), of polyoxyalkylene group-containing monomer units, relative to all monomer units, of the vinyl alcohol polymer, P×S, and the number, n, of the oxyalkylene repeating units in the polyoxyalkylene group-containing monomer unit satisfy the following numerical formulae (6) to (8):

$$n > -0.047 P \times S + 15 \quad (6),$$

$$n < -0.044 P \times S + 58 \quad (7),$$

$$P \times S > 5 \quad (8).$$

If the numerical formula (6) or the numerical formula (8) is not satisfied, then the ratio of the viscosity η1 at 60° C. to the viscosity η2 at 40° C., η1/η2 will be smaller than 0.8. If the numerical formula (7) is not satisfied, then the aqueous vinyl alcohol polymer solution may have a clouding point, or may readily undergo phase separation, or the vinyl alcohol polymer may be insoluble in water, and, as a result, the aqueous vinyl alcohol polymer solution will be difficult to handle or produce.

Preferably, the number, n, of the oxyalkylene repeating units in the polyoxyalkylene group-containing monomer unit satisfies 5<n<50, more preferably 10<n<40.

Also preferably, the content of the monomer units that have the polyoxyalkylene unit of formula (I) in the vinyl alcohol polymer of the invention is from 0.01 to 10 mol % relative to all monomer units of the vinyl alcohol polymer, more preferably from 0.03 to 5 mol %, even more preferably from 0.05 to 3 mol %. In view of solution stability and production costs of the aqueous solution, the content is preferably from 0.05 to 2 mol %, more preferably from 0.05 to 1 mol %, even more preferably from 0.05 to 0.5 mol %. If the content of the monomer units that have the polyoxyalkylene unit of formula (I) is smaller than 0.01 mol %, then the viscosity ratio η1/η2 will be smaller than 0.8. If the content of the monomer units that have the polyoxyalkylene unit of formula (I) is larger than 10 mol %, then the solubility in water of the vinyl alcohol polymer having the monomer units that have the polyoxyalkylene unit of formula (I) will be low and the production costs of the polymer may increase.

The viscosity-average degree of polymerization (hereinafter this may be abbreviated to "degree of polymerization") of the vinyl alcohol polymer of the invention is not specifically defined, but may be generally from 50 to 10,000, preferably from 100 to 8000, more preferably from 300 to 5000. If the degree of polymerization of the vinyl alcohol polymer is smaller than 50, then it is unfavorable for the following reasons: When the vinyl alcohol polymer of the type is used as a filler binder in the ink-receiving layer of an inkjet recording material, it could not serve as a binder for filler and therefore the ink-receiving layer formed will be brittle, and good inkjet recording materials could not be obtained. On the other hand, if the degree of polymerization of the vinyl alcohol polymer is larger than 10,000, the solid concentration of the aqueous solution or dispersion of the polymer could not be increased, or the viscosity of the aqueous solution or dispersion of the polymer may be too high and, as a result, the aqueous solution or dispersion of the polymer will be difficult to handle and, when it is applied onto a substrate, it does not form a uniform coating layer.

The degree of saponification of the vinyl alcohol polymer of the invention is not particularly limited, but is preferably from 70 to 99.99 mol %, more preferably from 75 to 99.5 mol %, even more preferably from 80 to 99.5 mol %. If the degree of saponification of the vinyl alcohol polymer is smaller than 70 mol %, then the polymer may be poorly soluble in water and, as a result the aqueous vinyl alcohol polymer solution may have a clouding point or may readily undergo phase separation, and the aqueous vinyl alcohol polymer solution will be difficult to handle. On the other hand, if the degree of saponification of the vinyl alcohol polymer is larger than 99.99 mol %, then the viscosity stability of the aqueous vinyl alcohol polymer solution may be poor.

So long as it does not detract from the effect of the present invention, the vinyl alcohol polymer of the invention may have additional monomer units that are derived from ethylenic unsaturated monomers capable of copolymerizing with vinyl ester monomers. The ethylenic unsaturated monomers capable of copolymerizing with vinyl ester monomers include, for example, α-olefins such as ethylene, propylene, 1-butene, isobutene, 1-hexene; unsaturated acids or their salts such as acrylic acid, methacrylic acid, crotonic acid, fumaric acid (anhydride), maleic acid (anhydride), itaconic acid (anhydride); $C_{1-18}$ mono or dialkyl esters of those unsaturated acids; acrylamides such as acrylamide, $C_{1-18}$ N-alkylacrylamides, N,N-dimethylacrylamide, 2-acrylamidopropanesulfonic acid or its salts, acrylamidopropyldimethylamine or its acid salts or quaternary salts; methacrylamides such as methacrylamide, $C_{1-18}$ N-alkylmethacrylamides, N,N-dimethylmethacrylamide, 2-methacrylamidopropanesulfonic acid or its salts, methacrylamidopropyldimethylamine or its acid salts or quaternary salts; N-vinylamides such as N-vinylpyrrolidone, N-vinylformamide, N-vinylacetamide; vinyl cyanides such as acrylonitrile, methacrylonitrile; vinyl ethers such as $C_{1-18}$ alkyl vinyl ethers, hydroxyalkyl vinyl ethers, alkoxyalkyl vinyl ethers; vinyl halides such as vinyl chloride, vinylidene chloride, vinyl fluoride, vinylidene fluoride, vinyl bromide; allyl acetate, allyl chloride, allyl alcohol, dimethylallyl alcohol, trimethyl-(3-acrylamido-3-dimethylpropyl)ammonium chloride, salts of acrylamido-2-methylpropanesulfonic acid, $C_{1-20}$ hydroxyalkyl group-containing α-olefins; silyl group-containing unsaturated monomers such as vinyltrimethoxysilane. However, these are not limitative. The ethylenic unsaturated monomer unit content of the vinyl alcohol polymer of the invention is preferably at most 20 mol % relative to all monomer units thereof.

The method for producing the vinyl alcohol polymer of the present invention is not particularly limited. As one embodiment, a polyvinyl ester that contains the polyoxyalkylene group-containing monomer units of formula (I) maybe saponified. For producing the polyvinyl ester, for example, can be mentioned a method of copolymerizing a polyoxyalkylene group-containing unsaturated monomer and a vinyl ester monomer, and a method of polymerizing a vinyl ester monomer in the presence of a polyoxyalkylene. In view of the quality of the polymer produced, the preferred method is the method of copolymerizing a polyoxyalkylene group-containing unsaturated monomer and a vinyl ester monomer. When a polyoxyalkylene group-containing unsaturated monomer is copolymerized with a vinyl ester monomer, they may be further copolymerized with any of the above-mentioned ethylenic unsaturated monomers capable of copolymerizing with the vinyl ester monomer.

Unsaturated monomers having the polyoxyalkylene group of formula (I) may be those of the following general formula (II):

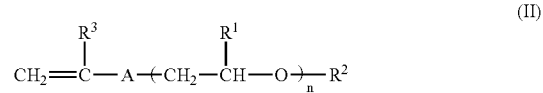

(II)

wherein $R^1$ represents an alkyl group having 1 or 2 carbon atoms; $R^2$ represents a hydrogen atom, or an alkyl group having from 1 to 4 carbon atoms; $R^3$ represents a hydrogen atom or a methyl group; and A represents a divalent linking group. Suitable divalent linking groups, A, include, but are not limited to carbonyloxy, carbonylimino, oxy and alkyleneoxy groups.

$R^1$ in the unsaturated monomer of formula (II) is preferably a methyl group. $R^2$ in the unsaturated monomer of formula (II) is preferably a hydrogen atom, a methyl group or a butyl group, more preferably a hydrogen atom or a methyl group. Even more preferably, $R^1$ in the unsaturated monomer of formula (II) is a methyl group, and $R^2$ is a hydrogen atom or a methyl group.

For example, when $R^2$ in formula (II) is a hydrogen atom, then specific examples of the unsaturated monomer of formula (II) are polyoxypropylene monoacrylate, polyoxypropylene monomethacrylate, polyoxypropylene monoacrylamide, polyoxypropylene monomethacrylamide, polyoxypropylene monoallyl ether, polyoxypropylene monomethallyl ether, polyoxypropylene monovinyl ether, polyoxybutylene monoacrylate, polyoxybutylene monomethacrylate, polyoxybutylene monoacrylamide, polyoxybutylene monomethacrylamide, polyoxybutylene monoallyl ether, polyoxybutylene monomethallyl ether, polyoxybutylene monovinyl ether. Of those, preferred are polyoxypropylene monoallyl ether and polyoxybutylene monoallyl ether; and more preferred is polyoxypropylene monoallyl ether.

When $R^2$ in formula (II) is an alkyl group having from 1 to 4 carbon atoms, then specific examples of the unsaturated monomer of formula (II) are those mentioned hereinabove for the case of $R^2$ being a hydrogen atom in formula (II) in which the terminal OH group is substituted with an alkoxy group having from 1 to 4 carbon atoms. Above all, preferred are unsaturated monomers of polyoxypropylene monoallyl ether or polyoxybutylene monoallyl ether in which the terminal OH is substituted with a methoxy group; and more preferred is an unsaturated monomer of polyoxypropylene monoallyl ether in which the terminal OH is substituted with a methoxy group.

The vinyl ester monomer includes, but is not limited to, vinyl formate, vinyl acetate, vinyl propionate, vinyl pivalate, vinyl versatate. Vinyl acetate is most preferably used.

For copolymerizing the polyoxyalkylene group-containing unsaturated monomer of formula (II) with the vinyl ester monomer, any known method can be used, including, but not limited to, bulk polymerization, solution polymerization, suspension polymerization or emulsion polymerization. Of those methods, the more preferred is a method of bulk polymerization in the presence of no solvent or a method of solution polymerization in a solvent such as alcohol. For producing polymers having a high degree of polymerization, a method of emulsion polymerization may be preferably employed. Alcohol that is used as the solvent in solution polymerization may be a lower alcohol such as methanol, ethanol or propanol. Of those, preferred is methanol. The initiator to be used for the polymerization may be any known initiator, including, but not limited to, an azo-type initiator such as 2,2'-azobisisobutyronitrile, 2,2'-azobis(2,4-dimethylvaleronitrile), 2,2'-azobis(4-methoxy-2,4-dimethylvaleronitrile); and a peroxide initiator such as benzoyl peroxide, n-propyl peroxycarbonate. The polymerization temperature is not specifically defined, but preferably falls between −30° C. and 150° C.

For saponifying the polyvinyl ester, any conventional method can be used. In general, however, the present invention employs a method of using an alkaline or acidic catalyst for saponifying the polyvinyl ester in an alcohol solution. For the alcohol used as solvent in the saponification, methanol is preferred. The saponification solvent is not limited to anhydrous solvents alone, but may contain a small amount of water. In addition, one or more additional cosolvents may be present, including but not limited to, organic solvents such as methyl acetate or ethyl acetate. The saponification temperature is preferably selected in the range from 10 to 70° C. The saponification catalyst is preferably an alkaline catalyst such as sodium hydroxide, potassium hydroxide, sodium methoxide, or potassium methoxide, or a mixture of two or more of these. The amount of the saponification catalyst to be used may be suitably determined depending on the intended degree of saponification and on the water content of the reaction system. Preferably, it is at least 0.001, more preferably at least 0.002, in terms of the molar ratio of catalyst to the vinyl ester units in the polymer.

In one embodiment of the present invention, the vinyl alcohol polymer can be used in a coating agent, based on the temperature-dependent viscosity behavior of the aqueous solution of the polymer. The coating agent that contains the vinyl alcohol polymer of the invention is particularly suitable for producing inkjet recording materials. When the coating agent that contains the vinyl alcohol polymer of the invention is applied onto a substrate to fabricate an inkjet recording material, the vinyl alcohol polymer preferably serves as the filler binder in the ink-receiving layer of the inkjet recording material. The thus produced ink-receiving layer has an especially high degree of surface glossiness (and may be referred to as a glossy layer).

When the vinyl alcohol polymer of the invention is used as the binder in the ink-receiving layer or the glossy layer, it may be used alone or may be combined with any other water-soluble or water-dispersible resin. Suitable water-soluble resins that may be combined with the vinyl alcohol polymer of the invention include, but are not limited to, cellulose derivatives such as methyl cellulose, hydroxyethyl cellulose, carboxymethyl cellulose (CMC); and albumin, gelatin, casein, starch, cationated starch, gum arabic, poly(meth)acrylamide, polyvinylpyrrolidone, sodium poly(meth)acrylate, anion-modified PVA, sodium alginate, water-soluble polyester resins, water-soluble polyamide resins, and water-soluble melamine resins. Suitable water-dispersible resins that may be combined with the vinyl alcohol polymer of the invention include, but are not limited to, SBR latexes, NBR latexes, vinyl acetate emulsions, ethylene/vinyl acetate copolymer emulsions, (meth)acrylic ester emulsions, and polyvinyl chloride emulsions.

When the vinyl alcohol polymer of the invention is used as a binder in the ink-receiving layer of an inkjet recording material, the filler to in the ink-receiving layer may be any conventional filler, including but not limited to, precipitated silica, silica gel, silica produced in a vapor phase process (hereinafter referred to as fumed silica), colloidal silica, colloidal alumina, aluminium hydroxide, pseudo-boehmite, clay, talc, diatomaceous earth, zeolite, calcium carbonate, alumina, zinc oxide, satin white, and organic pigments and mixtures thereof.

When the vinyl alcohol polymer of the invention is used as a binder in the glossy layer of an inkjet recording material, the filler to be in the glossy layer is not particularly limited with respect to its particle size. Preferably, the particle size is from 30 to 400 nm, more preferably from 80 to 400 nm. When the mean particle size of the filler is smaller than 30 nm, then capillaries can be difficult to form in the glossy layer and therefore the ink absorbability of the inkjet recording material may be poor. However, if the mean particle size is larger than 400 nm, the glossiness of the surface of the glossy layer may be unfavorably lowered. The filler that may be in the glossy layer may be any of inorganic fine particles or organic fine particles or combinations thereof. Suitable inorganic fine particles include, but are not limited to, colloidal silica, fumed silica, alumina sol, aluminum oxide fine particles, titanium oxide fine particles, and zinc oxide fine particles and mixtures thereof. Of these, colloidal silica, fumed silica, alumina sol, and aluminum oxide fine particles are preferred. Suitable organic fine particles include, but are not limited to, particles of polystyrene resins, polyacrylic resins, and styrene/acrylic copolymer resins, and mixtures thereof.

Colloidal silica, as used herein, is meant to indicate amorphous silica particles that are colloidal as dispersed in water. Colloidal silica particles that are negatively charged on their surface are preferably used. However, they may be surface-processed with a silane coupling agent so that they are positively charged, or they may be aggregated. Such positively-charged particles or aggregates are also preferred for use in the present invention.

The fumed silica is silicon dioxide that is preferably obtained by hydrolyzing a volatile silane compound in oxyhydrogen flames. The fumed silica is in the form of spherical primary particles having a mean particle size on the order of tens of nanometers (nm), and the final particles are aggregates of such primary particles. The secondary aggregates may be ground by the use of a grinder such as a bead mill, homogenizer, ultrasonic homogenizer or high-pressure homogenizer, to give fine particles having a grain size of from 30 to 400 nm, and these are preferably used in the present invention. In general, the fumed silica particles are negatively charged on their surface and they may be used as such. If desired, however, they may be positively charged on their surface through surface treatment, and the positively-charged particles are also preferably used.

As aluminum oxide fine particles, generally used are those having γ-type crystal morphology. The mean particle size of primary particles of γ-crystalline aluminum oxide maybe reduced to about 10 nm. However, as a powder, the primary particles form secondary aggregates and their particle size will be on the order of a few μm. Such secondary aggregates are ground by the use of a grinder, such as a bead mill, homogenizer, ultrasonic homogenizer or high-pressure homogenizer, to give fine particles having a grain size of from 30 to 400 nm, and these are preferably used in the present invention.

When the vinyl alcohol polymer of the invention is used as a binder for the fine particles in the glossy layer of an inkjet recording material, the weight ratio of vinyl alcohol polymer/fine particles is not particularly limited. Preferably, the weight ratio of vinyl alcohol polymer/fine particles is from 3/97 to 50/50, more preferably from 5/95 to 40/60, even more preferably from 8/92 to 30/70. If the weight ratio of vinyl alcohol polymer/fine particles is smaller than 3/97, the binder amount will be insufficient and the glossy layer may have insufficient strength. If the weight ratio of vinyl alcohol polymer/fine particles is larger than 50/50, the capillaries necessary for ink absorption may be difficult to form and the ink absorbability of the layer may be poor.

When the vinyl alcohol polymer of the invention is used in the ink-receiving layer or the glossy layer of an ink-jet recording material, a cationic resin may also be in the layer, serving as an ink fixer. Suitable cationic resins used for this purpose comprise monomer, oligomer or polymer that has a primary to tertiary amine or a quaternary ammonium salt capable of dissociating to be cationic when dissolved in water. Of those, preferred is oligomer or polymer. Specific preferred examples of the cationic resin include, but are not limited to, dimethylamine/epichlorohydrin polycondensates, acrylamide/diallylamine copolymers, polyvinylamine polymers, polyallylamine copolymers, diallyldimethylammonium chloride copolymers, and polyethylenimines.

The substrate for the inkjet recording material of the resent invention may be any known substrate used for such materials, preferably a transparent or opaque substrate. Suitable transparent substrates include, but are not limited to, films or sheets of polyester, polystyrene, polyvinyl chloride, polymethyl methacrylate, cellulose acetate, polycarbonate, polyimide, and cellophane or celluloid, as well as highly-transparent paper. Suitable opaque substrates include, but are not limited to, printing and writing paper, pigment-coated paper (artificial paper, cast-coated paper), resin-coated paper (polyethylene-laminated paper), cloth, wood, metal plate, and synthetic paper, as well as opaqued synthetic resin films and sheets.

For producing an inkjet recording material according to the present invention, having a substrate on which is coated a coating agent comprising the vinyl alcohol polymer of the present invention, a preferred method comprises dissolving or dispersing the vinyl alcohol polymer and optionally one or more fillers and/or ink fixers in an aqueous medium to prepare a coating agent, and applying the resulting coating agent onto a substrate by the use of a conventional means, including but not limited to, a size press, air knife coater, roll coater, bar coater, blade coater, curtain coater or cast coater. The coating temperature is not particularly limited, but preferably is in the range from 10° C. to 60° C., more preferably from 20° C. to 60° C., even more preferably from 30° C. to 50° C. When paper is used for the substrate, the aqueous solution or dispersion may be added to the paper-making system from which it is produced.

When the coating agent that contains the vinyl alcohol polymer of the invention is applied onto a substrate to produce an inkjet recording material, it is preferred that the coating layer formed on the substrate is dried at a temperature higher than the coating temperature by at least 20° C., without lowering the temperature of the coating layer. If the drying condition is satisfied, then the ink-receiving layer or the glossy layer of the inkjet recording material produced may be more positively protected from being cracked.

When the coating liquid that contains the vinyl alcohol polymer of the present invention is used for forming the ink-receiving layer or the glossy layer of an inkjet recording material, then the layer formed is prevented from being cracked only of it is dried at a temperature higher than the coating temperature without once cooling the coating layer after formation. Accordingly, the production speed, or the producibility of inkjet recording materials is extremely improved and, in addition, other utility costs such as power consumption may be greatly reduced. Furthermore, high-glossiness inkjet recording materials maybe produced even in coating lines with no cooling zone utility equipment.

Though not clear (and not intended to be limiting of the present invention), the cracking preventing mechanism is believed to be as follows:

At low temperatures at which the coating liquid that contains the vinyl alcohol polymer of the invention is applied to a substrate, the polyoxyalkylene site in the polymer is hydrated with water having a cluster structure and the hydrophobic interaction in the polyoxyalkylene site is thereby retarded in that condition. On the other hand, at high temperatures at which the coating layer is dried, the polyoxyalkylene site is dehydrated and is associated owing to hydrophobic interactions. As a result of this phenomenon, the vinyl alcohol polymer at high temperatures is essentially intermolecularly crosslinked owing to hydrophobic interactions of the polyoxyalkylene site in the polymer. Accordingly, the viscosity of the coating liquid that contains the vinyl alcohol polymer of the invention increases when it is applied onto a substrate and is heated, and further the resulting coating layer is gelled due to water evaporation and the liquid concentration increase in the drying process. The coating layer thus formed through the process may have a firm three-dimensional structure, and it is believed that the layer will not be significantly cracked.

EXAMPLES

The present invention is described in more detail with reference to the following Examples, to which, however, the invention should not be limited. Unless otherwise specifically indicated, "%" and "part" in the Examples are all by weight, and the "degree of polymerization" is in terms of the viscosity-average degree of polymerization.

I. Production and Evaluation of PVA:

PVA was produced according to the method mentioned below, and the degree of polymerization and the degree of saponification, the polyoxyalkylene group-containing monomer unit content, and the viscosity ratio $\eta_1/\eta_2$ of the aqueous solution were determined.

Degree of Polymerization, and Degree of Saponification

The degree of polymerization and the degree of saponification of PVA were determined according to the method described in JIS-K6726, the contents of which are hereby incorporated by reference.

Polyoxyalkylene Group-containing Monomer Unit Content

A gel obtained by saponification of a polyvinyl ester is ground, and subjected to Soxhlet washing with methanol for 3 days. The resulting product was dried under reduced pressure at 80° C. for 3 days to obtain a pure PVA. The pure PVA was dissolved in a heavy water solvent to prepare a sample to be analyzed. Using a 500 MHz-proton NMR device (JEOL's GX-500), the sample was analyzed through NMR spectrometry to determine the polyoxyalkylene group-containing monomer unit content of the polymer.

Viscosity Ratio $\eta_1/\eta_2$ of Aqueous Solution

An aqueous 8% solution of PVA was prepared, and its viscosity $\eta_1$ at 60° C. was measured with a BL-type viscometer driven at a rotor speed of 60 rpm. Next, the viscosity $\eta_2$ of the solution was measured at 40° C. with the BL-type viscometer driven at a rotor speed of 60 rpm. The viscosity ratio $\eta_1/\eta_2$ of the aqueous PVA solution is calculated.

PVA-1:

2282 g of vinyl acetate, 198 g of methanol, and 100 g of an unsaturated monomer having a polyoxypropylene group of formula (II) where $R^1$ and $R^2$ are methyl groups, $R^3$ is a hydrogen atom, A is a methyleneoxy group and the mean number n of the oxyalkylene repeating units is 24 (polyoxypropylene monoallyl ether (hereinafter abbreviated as POPMA) in which the terminal OH was substituted with a methoxy group) were fed into a 6-liter reactor equipped with a reflux condenser, a stirrer, a thermometer, a nitrogen inlet duct, a mouth for later addition of liquid, and a pump. With stirring, the polymerization system was purged with nitrogen. This was heated, and when it reached a constant temperature 60° C., 1.3 g of 2,2'-azobisisobutyronitrile (hereinafter abbreviated as AIBN) were added and the polymerization of the system was started. After the start of the polymerization, the system was sampled and analyzed for solid concentration, and the polymerization was thus continued. After 1.8 hours, the reactor was cooled and the polymerization was stopped. At the time when the polymerization was stopped, the conversion was 30%. The polymer paste obtained was dropped into n-hexane to precipitate the polymer. The precipitated polymer was collected, dissolved in acetone, and again precipitated in n-hexane. This re-reprecipitation/purification operation was repeated three times. Then, the polymer was dissolved in acetone, dropped into distilled water, and boiled for purification. After drying at 60° C., pure polyvinyl acetate (hereinafter abbreviated as PVAc) was obtained.

A methanol solution of 17.5% of the pure PVAc was then prepared. While the methanol solution of pure PVAc was stirred at 40° C., a methanol solution of 10% sodium hydroxide was added to it, in a controlled manner such that the molar ratio of sodium hydroxide to the vinyl acetate unit in PVAc was 0.02, and the polymer was saponified for 60 minutes. The resulting gel was ground, subjected to Soxhlet washing with methanol for 3 days, and dried under reduced pressure at 80° C. for 3 days to obtain a pure PVA. The degree of polymerization of the polymer was 2400; and the degree of saponification was 98.5 mol %. Through proton NMR spectrometry, the methoxy-terminated POPMA unit content of the pure PVA was determined to be 0.1 mol % relative to all monomer units of the polymer. PVA thus obtained is referred to as PVA-1. The basic structure of PVA-1 and the viscosity of its aqueous solution are given in Table 2.

PVA-2 to PVA-9, PVA-11, PVA-13, and PVA-14:

Various PVAs were prepared in the same manner as that for PVA-1, except that the polymerization conditions (the amount of vinyl acetate and that of methanol fed into the reactor, the type and the amount of the polyoxyalkylene group-containing monomer, the amount of the polymerization initiator, the polymerization time) and the saponification conditions were varied as in Table 1. The basic structure of each PVA thus obtained and the viscosity of an aqueous solution thereof are given in Table 2.

PVA-10:

2350 parts of vinyl acetate monomer, and 2.2 parts of an unsaturated monomer having a polyoxypropylene group of formula (II) where $R^1$ and $R^2$ are methyl groups, $R^3$ is a hydrogen atom, A is a carbonylimino group and the mean number n of the oxyalkylene repeating units is 38 (polyoxypropylene-monoacrylamide (hereinafter abbreviated as POPAA) in which the terminal OH was substituted with a methoxy group) were fed into a reactor equipped with a stirrer, a reflux condenser, a nitrogen inlet duct, and a thermometer. This was purged with nitrogen by bubbling nitrogen gas through it for 30 minutes. Separately, an initiator solution was prepared by dissolving 0.8 parts of AIBN in 50 parts of vinyl acetate, and this was purged with nitrogen by bubbling nitrogen gas therethrough. Additionally, a methanol solution of methoxy-terminated POPAA was purged with nitrogen by bubbling nitrogen gas therethrough. The reactor was heated, and when its inner temperature reached 60° C., the initiator solution separately prepared as above was added to it and the polymerization was started. The methanol solution of methoxy-terminated POPAA was added dropwise to the reactor so that the monomer composition in the polymerization system could be kept constant, and with that, the polymerization was continued for 5 hours at 60° C. The reactor was cooled to stop the polymerization. At the time when the polymerization was stopped, the conversion was 15%. The polymer paste obtained was dropped into n-hexane to precipitate the polymer. The precipitated polymer was collected, dissolved in acetone, and again precipitated in n-hexane. This reprecipitation/purification operation was repeated three times. The polymer was then dissolved in acetone, dropped into distilled water, and boiled for purification. After dyring at 60° C., pure PVAc was obtained.

A methanol solution of 13% of the pure PVAc was then prepared. While the methanol solution of pure PVAC was stirred at 40° C., a methanol solution of 10% sodium hydroxide was added in a controlled manner such that the molar ratio of sodium hydroxide to the vinyl acetate unit in PVAc was 0.009, and the polymer was saponified for 60 minutes. The resulting gel was ground, subjected to Soxhlet washing with methanol for 3 days, and dried under reduced pressure at 80° C. for 3 days to obtain a pure PVA. The degree of polymerization of the polymer was 4500; and the degree of saponification was 88.5 mol %. Through proton NMR spectrometry, the methoxy-terminated POPAA unit content of the pure PVA was determined to be 0.04 mol % relative to all monomer units of the polymer. PVA thus obtained is referred to as PVA-10. The basic structure of PVA-10 and the viscosity of its aqueous solution are given in Table 2.

PVA-12:

3825 g of vinyl acetate, 650 g of methanol, 173 g of an unsaturated monomer having a polyoxypropylene group of formula (II) where $R^1$ and $R^2$ are methyl groups, $R^3$ is a hydrogen atom, A is a methyleneoxy group and the mean number n of the oxyalkylene repeating units is 24 (POPMA in which the terminal OH was substituted with a methoxy group), and 5.7 g of vinyltrimethoxysilane were fed into a 6-liter separable flask equipped with a stirrer, a temperature sensor, a dropping funnel and a reflux condenser. Under stirring, the resulting solution was purged with nitrogen, and the inner temperature of the separable flask was elevated up to 60° C. 25 g of methanol that contained 2.2 g of AIBN were added to the system, and the polymerization was started. From the start of the polymerization, 330 g of methanol that contained 0.3% by weight of vinyltrimethoxysilane were added to the system, and the polymerization was continued for 3.3 hours, then stopped. At the time when the polymerization was stopped, the conversion was 45%. The polymer paste obtained was dropped into n-hexane to precipitate the polymer. The precipitated polymer was collected, dissolved in acetone, and again precipitated in n-hexane. This reprecipitation/purification operation was repeated three times. The polymer was then dissolved in acetone, dropped into distilled water, and boiled for purification. After drying at 60° C., pure PVAc was obtained.

A methanol solution of a concentration of 17.5% of the pure PVAc was prepared. While the methanol solution of pure PVAc was stirred at 40° C., a methanol solution of a concentration of 10% sodium hydroxide was added to it in a controlled manner, such that the molar ratio of sodium hydroxide to the vinyl acetate unit in PVAc was 0.02, and the polymer was saponified for 60 minutes. The resulting gel was ground, subjected to Soxhlet washing with methanol for 3 days, and dried under reduced pressure at 80° C. for 3 days to obtain a pure PVA. The degree of polymerization of the polymer was 1760; and the degree of saponification was 98.5 mol %. Through proton NMR spectrometry, the methoxy-terminated POPMA unit content of the pure PVA was determined to be 0.1 mol % relative to all monomer units of the polymer. The degree of modification with vinyltrimethoxysilane of the polymer was 0.1 mol %. PVA thus obtained is referred to as PVA-12. The basic structure of PVA-12 and the viscosity of its aqueous solution are given in Table 2.

PVA-15 to PVA-37:

Various PVAs were prepared in the same manner as that for PVA-1, except that the polymerization conditions and the saponification conditions were varied as in Table 4. The basic structure of each PVA thus obtained and the viscosity of an aqueous solution thereof are given in Table 5.

II. Fabrication and Evaluation of Inkjet Recording Materials:

Inkjet recording paper was fabricated according to the method mentioned below, checked for cracks in the ink-receiving layer, and evaluated with respect to the surface glossiness and the transmittance thereof. In addition, prints were made on the recording paper, using an inkjet printer, whereupon the recording paper was evaluated with respect to the ink absorbability thereof.

(1) Cracking:

The surface of the ink-receiving layer was observed with an optical microscope (having a magnifying power of 100), and evaluated according to the following criteria:
A: No crack found in the surface.
B: Cracks found partly in the surface
C: Cracks found entirely in the surface.

(2) Glossiness:

The surface glossiness of the ink-receiving layer was determined with a gloss meter (by Nippon Denshoku Kogyo), according to JIS-Z8714 (mirror glossiness at an incident angle of 60 degrees). Each sample was measured five times, and the data were averaged to give the surface glossiness of the sample.

(3) Transmittance:

An ink-receiving layer was formed on a polyethylene terephthalate (hereinafter abbreviated as PET) substrate to prepare a recording material. Using a spectrophotometer (Shimadzu's UV2100), the transmittance of the sample at 500 nm of the wavelength was measured.

(4) Ink Absorption Speed:

Using an inkjet printer (Seiko Epson's PM2000C), a solid image was printed on the inkjet recording material with black ink. At regular time intervals, the printed surface was rubbed with fingers, and its condition was observed as to whether it was blurred or not. The time after which the printed image that had been rubbed with fingers was not blurred at all was counted, and the tested sample was evaluated according to the following criteria:

A: shorter than 5 seconds.
B: from 5 seconds to shorter than 10 seconds.
C: from 10 seconds to shorter than 30 seconds.
D: 30 seconds or more.

Example 1

(Preparation of Fumed silica Fine Particle Dispersion)

600 g of fumed silica powder Aerosil A300 (by Nippon Aerosil—its primary particles have a mean particle size of about 12 nm) was added to 2400 g of ion-exchanged water with 12 g of acetic acid dissolved therein, and dispersed by stirring with a unidirectional stirrer to prepare a dispersion having a solid concentration of 20% by weight. The resulting dispersion was milled with a homogenizer (IKA's ULTRA-TURRAX T25 Model) at 9500 rpm for 5 minutes to give a milky-white slurry-like viscous dispersion (solid concentration, 20%). The mean particle size of the inorganic fine particles dispersed in this dispersion were measured with a laser diffraction/scattering-type particle sizer (Horiba Seisakusho's LA-910), and found to be 230 nm.

(Fabrication of Inkjet Recording Material)

400 g of an aqueous solution of PVA-1 having a solid concentration of 10% was prepared, and added to 1000 g of the fumed silica dispersion having a solid concentration of 20% (prepared above), and well mixed and stirred to prepare a dispersion. Distilled water was added to the dispersion to make a coating liquid having a solid concentration of 17% by weight. The solution viscosity of the coating liquid was measured with a BL-type viscometer, at a rotor speed of 60 rpm and at a temperature of 30° C., and found to be 63 mpa·s.

Using a Mayer bar, the coating liquid was applied onto the surface of a PET film, that had been processed for corona discharging treatment, at 30° C. so that the coating amount (after drying) would be 15 g/m$^2$. The coating was dried with a hot air drier at 110° C. for 5 minutes to fabricate an inkjet recording sheet. The evaluation result of the sheet is shown in Table 3.

Example 2

(Preparation of Vapor-Phase-Process Alumina Fine Particle Dispersion)

600 g of vapor-phase-process aluminium oxide powder Aluminium Oxide C (by Nippon Aerosil—its primary particles have a mean particle size of about 13 nm) was added to 2400 g of ion-exchanged water with 12 g of acetic acid dissolved therein, and this was dispersed by stirring it with a unidirectional stirrer to prepare a dispersion having a solid concentration of 20% by weight. The resulting dispersion was milled with a homogenizer (IKA's ULTRA-TURRAX T25 Model) at 9500 rpm for 3 minutes to give a milky-white slurry-like viscous dispersion (solid concentration, 20%). The mean particle size of the inorganic fine particles dispersed in this dispersion were measured with a laser diffraction/scattering-type particle sizer (Horiba Seisakusho's LA-910), and found to be 350 nm.

(Fabrication of Inkjet Recording Material)

400 g of an aqueous solution of PVA-2 having a solid concentration of 10% was prepared, and added to 1000 g of the vapor-phase-process alumina dispersion having a solid concentration of 20% (prepared above), and well mixed and stirred to prepare a dispersion. Distilled water was added to the dispersion to make a coating liquid having a solid concentration of 17% by weight. The solution viscosity of the coating liquid was measured with a BL-type viscometer, at a rotor speed of 60 rpm and at a temperature of 30° C., and found to be 60 mPa·s.

Using a Mayer bar, the coating liquid was applied onto the surface of a Polyethylene-laminated paper that had been processed for corona discharging treatment, at 50° C. so that the coating amount thereof (after drying) would be 15 g/m². The coating was dried with a hot air drier at 90° C. for 5 minutes to fabricate an inkjet recording sheet. The evaluation result of the sheet is shown in Table 3.

Example 3

To 1000 g of a dispersion (solid concentration, 40%) of colloidal silica aggregates processed with a silane coupling agent on their surface and having a particle size of 84 nm (Grace's Sylojet 4000C), 400 g of an aqueous solution of PVA-1 having a solid concentration of 10% were added, along with 20 g of an aqueous solution of a cationic resin (SenKa's Paviogen P-105, having a solid concentration of 60%), and the resulting mixture well mixed and stirred to prepare a dispersion. Distilled water was added to the dispersion to prepare a coating liquid having a solid concentration of 31%. Using a BL-type viscometer, the solution viscosity of the coating liquid was measured at a rotor speed of 60 rpm and at a temperature of 30° C., and found to be 270 mpa·s.

Using a Mayer bar, the coating liquid was applied onto the surface of a PET film that had been processed for corona discharging treatment, at 40° C. so that the coating amount thereof (after drying) would be 15 g/m². The coating was dried with a hot air drier at 100° C. for 5 minutes to fabricate an ink-jet recording sheet. The evaluation result of the sheet is shown in Table 3.

Example 4

Silica gel was wet ground, and was then cation-processed on the surface thereof to prepare sub-micron silica gel having a particle size of 253 nm (Grace's Sylojet 733C). To 1000 g of a dispersion of the silica gel having a solid concentration of 30%, was added 400 g of an aqueous solution of PVA-2 having a solid concentration of 10%, and the resulting mixture well mixed and stirred to prepare a dispersion. Distilled water was added to the dispersion to prepare a coating liquid having a solid concentration of 21% by weight. Using a BL-type viscometer, the solution viscosity of the coating liquid was measured at a rotor speed of 60 rpm and at a temperature of 30° C., and found to be 310 mPa·s.

Using a Mayer bar, the coating liquid was applied onto the surface of a commercial product, cast-coated paper at 40° C. so that the coating amount thereof (after drying) would be 15 g/m². The coating was dried with a hot air drier at 110° C. for 5 minutes to fabricate an inkjet recording sheet. The evaluation result of the sheet is shown in Table 3.

Examples 5 to 16

Inkjet recording materials were fabricated in the same manner as in Example 1, except that the type and the amount of PVA, the type and the amount of inorganic fine particles, the concentration of the coating liquid, the coating temperature and the drying temperature were varied as in Table 3. The evaluation results of the thus-obtained inkjet recording materials are shown in Table 3.

Comparative Examples 1 to 5

Inkjet recording materials were fabricated in the same manner as in Example 1, except that the type and the amount of PVA, the type and the amount of inorganic fine particles, the concentration of the coating liquid, the coating temperature and the drying temperature were varied as in Table 3. The evaluation results of the thus-obtained inkjet recording materials are shown in Table 3.

TABLE 1

| | Polymerization Condition | | | | | | | | | Saponification Condition | |
|---|---|---|---|---|---|---|---|---|---|---|---|
| | vinyl acetate (g) | oxyalkylene group-containing monomer[1] | | | | methanol (g) | AIBN (g) | polymerization time (hr) | conversion (%) | concentration (%) | alkali molar ratio[2] |
| | | type | $R^1$ | n | $R^2$ | (g) | | | | | | |
| PVA-1 | 2282 | POPMA | methyl | 24 | methyl | 100 | 198 | 1.3 | 1.8 | 30 | 17.5 | 0.02 |
| PVA-2 | 2568 | POPMA | methyl | 24 | methyl | 60 | 350 | 2.7 | 1.2 | 33 | 17.5 | 0.009 |
| PVA-3 | 2232 | POPMA | methyl | 24 | methyl | 190 | 248 | 2.7 | 2.0 | 40 | 17.5 | 0.02 |
| PVA-4 | 2480 | POPMA | methyl | 16 | butyl | 109 | 0 | 0.8 | 3.3 | 20 | 17.5 | 0.01 |
| PVA-5 | 1575 | POPVE | methyl | 33 | methyl | 500 | 1925 | 8.4 | 4.0 | 60 | 30.0 | 0.005 |
| PVA-6 | 2400 | POBMA | ethyl | 6 | methyl | 600 | 0 | 2.1 | 3.5 | 60 | 30.0 | 0.02 |
| PVA-7 | 1920 | POPVE | methyl | 48 | methyl | 100 | 480 | 1.2 | 3.5 | 50 | 17.5 | 0.01 |
| PVA-8 | 2280 | POPMA | methyl | 16 | methyl | 100 | 120 | 0.2 | 4.0 | 20 | 17.5 | 0.004 |
| PVA-9 | 1500 | POBMA | ethyl | 8 | butyl | 1000 | 0 | 1.7 | 4.0 | 50 | 30.0 | 0.025 |
| PVA-10 | 2400 | POPAA | methyl | 38 | methyl | 5.9 | 0 | 0.8 | 5.0 | 15 | 13.0 | 0.009 |
| PVA-11 | 1800 | POPMA | methyl | 24 | butyl | 30 | 600 | 0.7 | 4.0 | 40 | 17.5 | 0.006 |
| PVA-12[3] | 3825 | POPMA | methyl | 24 | methyl | 173 | 675 | 2.2 | 3.3 | 45 | 17.5 | 0.02 |
| PVA-13 | 2480 | POEMA | hydrogen | 33 | methyl | 225 | 0 | 0.8 | 5.2 | 20 | 17.5 | 0.02 |
| PVA-14 | 2480 | POEMA | hydrogen | 8 | methyl | 56 | 0 | 0.5 | 5.0 | 20 | 17.5 | 0.009 |

[1]POPMA: polyoxypropylene monoallyl ether,
POPAA: polyoxypropylene-acrylamide,
POEMA: polyoxyethylene monoallyl ether,
POPVE: polyoxypropylene vinyl ether,
POBMA: polyoxybutylene monoallyl ether.
[2]alkali molar ratio; NaOH/VAc unit in PVAc (by mol).
[3]0.1 mo % modified with vinyltrimethoxysilane.

TABLE 2

| | PVA Polymer | | | | | Aqueous Solution Viscosity (mPa · s)[1] | | | | | | | Viscosity Ratio[2] |
|---|---|---|---|---|---|---|---|---|---|---|---|---|---|
| | degree of modification[4] (mol %) | degree of saponification (mol %) | degree of polymerization | P × S | n | 5° C. | 10° C. | 20° C. | 30° C. | 40° C. | 50° C. | 60° C. | η1/η2 |
| PVA-1 | 0.1 | 98.5 | 2400 | 240 | 24 | 2050 | 1650 | 976 | 866 | 3480 | 19460 | >10⁵ | >29 |
| PVA-2 | 0.05 | 88.9 | 2310 | 116 | 24 | 2000 | 1600 | 952 | 680 | 820 | 1630 | 3390 | 4.1 |
| PVA-3 | 0.21 | 98.6 | 1680 | 353 | 24 | 1050 | 850 | 480 | 393 | 2996 | 36000 | >10⁶ | >33 |
| PVA-4 | 0.23 | 94.0 | 2000 | 460 | 16 | 1450 | 1050 | 618 | 436 | 666 | 1690 | 2050 | 3.1 |
| PVA-5 | 0.51 | 81.0 | 310 | 158 | 33 | 210 | 170 | 110 | 83 | 8300 | >10⁵ | >10⁵ | >12 |
| PVA-6 | 2.0 | 98.3 | 410 | 820 | 6 | 260 | 255 | 250 | 245 | 240 | 225 | 210 | 0.9 |
| PVA-7 | 0.06 | 93.1 | 1700 | 102 | 48 | 2000 | 1570 | 500 | 400 | 4500 | 46200 | >10⁵ | >22 |
| PVA-8 | 0.14 | 72.0 | 2440 | 342 | 16 | 1000 | 790 | 980 | 870 | 1530 | 2500 | 3900 | 2.5 |
| PVA-9 | 3.7 | 99.8 | 230 | 851 | 8 | 204 | 200 | 196 | 192 | 187 | 184 | 180 | 1.0 |
| PVA-10 | 0.04 | 88.5 | 4500 | 180 | 38 | 10100 | 9000 | 6700 | 5000 | 3500 | 23000 | >10⁵ | >29 |
| PVA-11 | 0.04 | 78.0 | 1660 | 66 | 24 | 900 | 720 | 470 | 390 | 560 | 780 | 1090 | 1.9 |
| PVA-12[3] | 0.1 | 98.5 | 1760 | 176 | 24 | 1100 | 870 | 560 | 410 | 540 | 2410 | 10000 | 19 |
| PVA-13 | 1.1 | 98.8 | 1210 | 1331 | 33 | 160 | 120 | 85 | 67 | 49 | 33 | 28 | 0.6 |
| PVA-14 | 0.38 | 88.2 | 1760 | 669 | 8 | 620 | 490 | 348 | 226 | 164 | 87 | 58 | 0.4 |
| PVA117 | — | 98.5 | 1750 | — | — | 360 | 305 | 270 | 196 | 157 | 130 | 100 | 0.6 |
| PVA224 | — | 88.0 | 2400 | — | — | 1400 | 1100 | 798 | 550 | 390 | 303 | 220 | 0.6 |
| PVA124 | — | 98.5 | 2400 | — | — | 1700 | 1400 | 1130 | 780 | 534 | 419 | 300 | 0.6 |

[1] aqueous solution viscosity at concentration of 8% (measurement limit 10⁵ mPa · s).
[2] ratio of η1 of aqueous 8% solution measured with BL-type viscometer at 60° C. and 60 rpm to η² thereof at 40° C. and 60 rpm.
[3] 0.1 mol % modified with vinyltrimethoxysilane.
[4] "degree of modification" means the polyoxyalkylene group-containing monomer unit content (mol %), relative to all monomer units, of the vinyl alcohol polymer

TABLE 3

| | Binder | | Inorganic Fine Particles | | | Concentration |
|---|---|---|---|---|---|---|
| | PVA[1] | part | Designation[2] | particle size (nm) | part | (%) |
| Example 1 | PVA-1 | 20 | A-300 | 230 | 100 | 17 |
| Example 2 | PVA-2 | 20 | Aluminium Oxide C | 350 | 100 | 17 |
| Example 3 | PVA-1 | 10 | 4000C | 84 | 100 | 31 |
| Example 4 | PVA-2 | 25 | 733C | 253 | 100 | 21 |
| Example 5 | PVA-3 | 10 | 4000C | 84 | 100 | 31 |
| Example 6 | PVA-4 | 10 | 4000C | 84 | 100 | 31 |
| Example 7 | PVA-5 | 20 | Aluminium Oxide C | 350 | 100 | 17 |
| Example 8 | PVA-6 | 20 | 4000C | 84 | 100 | 35 |
| Example 9 | PVA-7 | 20 | MOX170 | 190 | 100 | 17 |
| Example 10 | PVA-8 | 10 | 4000C | 84 | 100 | 31 |
| Example 11 | PVA-9 | 40 | 4000C | 84 | 100 | 35 |
| Example 12 | PVA-10 | 4 | 4000C | 84 | 100 | 35 |
| Example 13 | PVA-11 | 10 | SN20L | 45 | 100 | 18 |
| Example 14 | PVA-11 | 10 | ST-O | 20 | 100 | 18 |
| Example 15 | PVA-12 | 10 | 4000C | 84 | 100 | 31 |
| Example 16 | PVA-1 | 20 | A-300 | 650 | 100 | 17 |
| Comp. Ex. 1 | PVA-13 | 10 | 4000C | 84 | 100 | 31 |
| Comp. Ex. 2 | PVA-14 | 10 | 4000C | 84 | 100 | 31 |
| Comp. Ex. 3 | PVA117 | 10 | 4000C | 84 | 100 | 31 |
| Comp. Ex. 4 | PVA224 | 10 | 4000C | 84 | 100 | 31 |
| Comp. Ex. 5 | PVA124 | 10 | 4000C | 84 | 100 | 31 |

| | Viscosity of Coating Liquid (mPa · s) | | | | | Coating Temp. (° C.) | Drying Temp. (° C.) | Physical Properties of Coating Layer | | | |
|---|---|---|---|---|---|---|---|---|---|---|---|
| | 20° C. | 30° C. | 40° C. | 50° C. | 60° C. | | | cracking | glossiness | transmittance (%) | ink absorption |
| Example 1 | 75 | 63 | 110 | 896 | 2900 | 30 | 110 | A | 39 | 51 | A |
| Example 2 | 71 | 60 | 55 | 120 | 210 | 50 | 90 | A | 36 | — | A |
| Example 3 | 584 | 270 | 172 | 325 | 500 | 40 | 100 | A | 95 | 82 | A |
| Example 4 | 460 | 310 | 200 | 240 | 280 | 40 | 110 | A | 28 | — | A |
| Example 5 | 366 | 209 | 447 | 1980 | 916 | 40 | 110 | A | 96 | 85 | A |
| Example 6 | 455 | 218 | 160 | 200 | 245 | 40 | 110 | A | 90 | 78 | B |
| Example 7 | 98 | 80 | 63 | 68 | 75 | 40 | 110 | A | 35 | 46 | A |
| Example 8 | 180 | 176 | 168 | 160 | 156 | 40 | 110 | B | 34 | 8 | C |

TABLE 3-continued

| | | | | | | | | | | | |
|---|---|---|---|---|---|---|---|---|---|---|---|
| Example 9 | 58 | 43 | 35 | 38 | 42 | 40 | 50 | B | 30 | 39 | B |
| Example 10 | 380 | 180 | 140 | 178 | 220 | 40 | 90 | A | 58 | 32 | B |
| Example 11 | 810 | 590 | 470 | 500 | 520 | 40 | 110 | B | 30 | 5 | C |
| Example 12 | 91 | 62 | 48 | 57 | 75 | 60 | 100 | B | 86 | 79 | B |
| Example 13 | 51 | 37 | 28 | 30 | 36 | 40 | 100 | B | 76 | 85 | B |
| Example 14 | 48 | 35 | 25 | 26 | 32 | 40 | 100 | B | 73 | 80 | C |
| Example 15 | 407 | 204 | 154 | 263 | 300 | 40 | 85 | A | 96 | 79 | A |
| Example 16 | 90 | 70 | 100 | 950 | 1900 | 30 | 110 | A | 9 | 3 | B |
| Comp. Ex. 1 | 21 | 14 | 13 | 10 | 8 | 40 | 110 | C | 65 | 21 | D |
| Comp. Ex. 2 | 81 | 52 | 37 | 32 | 24 | 40 | 110 | C | 58 | 17 | D |
| Comp. Ex. 3 | 80 | 50 | 35 | 27 | 20 | 40 | 110 | A | 2 | 1 | B |
| Comp. Ex. 4 | 195 | 140 | 100 | 80 | 67 | 40 | 110 | A | 0 | 1 | B |
| Comp. Ex. 5 | 205 | 160 | 110 | 92 | 75 | 40 | 110 | A | 0 | 1 | B |

[1]PVA117 (by Kuraray, degree of saponification 98.5 mol %, degree of polymerization 1750). PVA224 (by Kuraray, degree of saponification 88 mol %, degree of polymerization 2400).
[2]A-300: Aerosil A-300 (by Nippon Aerosil). Aluminium Oxide C: aluminium oxide C (by Nippon Aerosil). SN20L: colloidal silica (by Nissan Chemical). ST-O: colloidal silica (by Nissan Chemical). MOX170: Aerosil MOX170 (by Nippon Aerosil). 4000C: Sylojet 4000C (by Grace). 733C: Sylojet 733C (by Grace).

In Table 1 and Table 2, PVA-1 to PVA-12 are vinyl alcohol polymers that have polyoxyalkylene group-containing monomer units of formula (I) where $R^1$ is an alkyl group having 1 or 2 carbon atoms, $R^2$ is an alkyl group having from 1 to 4 carbon atoms; and when the viscosity of an aqueous 8 wt. % solution of the vinyl alcohol polymer is measured with a BL-type viscometer at a rotor speed of 60 rpm, then the ratio of the viscosity η1 thereof at 60° C. to the viscosity η2 thereof at 40° C., η1/η2 is at least 0.8; and the number n of the oxyalkylene repeating units in the polyoxyalkylene group-containing monomer unit of the polymer satisfies 1≦n≦100. Accordingly, they are within the scope of the vinyl alcohol polymer of the invention.

On the other hand, PVA-13 and PVA-14 are vinyl alcohol polymers that have polyoxyalkylene group-containing monomer units of formula (I) where $R^1$ is a hydrogen atom; but the viscosity ratio η1/η2 of the aqueous 8 wt. % solution of the polymer was smaller than 0.8. In addition, regarding the non-modified PVAs, PVA117 (by Kuraray, having a degree of saponification of 98.5 mol % and a degree of polymerization of 1750) and PVA224 (by Kuraray, having a degree of saponification of 88 mol % and a degree of polymerization of 2400), the viscosity ratio η1/η2 of the aqueous 8 wt. % solution of the polymer was smaller than 0.8.

From the results in Table 3, it is understood that, when the vinyl alcohol polymer of the invention is used as the filler binder in the ink-receiving layer of an inkjet recording material, then the ink-receiving layer does not crack, is glossy and transparent and absorbs ink well (Examples 1 to 16).

On the other hand, the vinyl alcohol polymer having polyoxyalkylene group-containing monomer units of formula (I) where $R^1$ is a hydrogen, and the non-modified PVAs could not satisfy the necessary physical properties of surface cracking resistance, glossiness, ink absorbability and transparency (Comparative Examples 1 to 5).

Examples 17, 19, and 21 to 33

Inkjet recording materials were fabricated in the same manner as in Example 1, except that the type and the amount of PVA, the type and the amount of inorganic fine particles, the concentration of the coating liquid, the coating temperature and the drying temperature were varied as in Table 6. The evaluation results of the thus-obtained inkjet recording materials are shown in Table 6.

Example 18

Inkjet recording materials were fabricated in the same manner as in Example 2, except that the type and the amount of PVA, the type and the amount of inorganic fine particles, the concentration of the coating liquid, the coating temperature and the drying temperature were varied as in Table 6. The evaluation results of the thus-obtained inkjet recording materials are shown in Table 6.

Example 20

Inkjet recording materials were fabricated in the same manner as in Example 4, except that the type and the amount of PVA, the type and the amount of inorganic fine particles, the concentration of the coating liquid, the coating temperature and the drying temperature were varied as in Table 6. The evaluation results of the thus-obtained inkjet recording materials are shown in Table 6.

Comparative Examples 6 to 14

Inkjet recording materials were fabricated in the same manner as in Example 1, except that the type and the amount of PVA, the type and the amount of inorganic fine particles, the concentration of the coating liquid, the coating temperature and the drying temperature were varied as in Table 7. The evaluation results of the thus-obtained inkjet recording materials are shown in Table 7.

TABLE 4

| | | Polymerization Condition | | | | | | | | Saponification Condition | |
|---|---|---|---|---|---|---|---|---|---|---|---|
| | vinyl | oxyalkylene group-containing monomer[1] | | | | methanol | AIBN | polymerization time (hr) | conversion (%) | concentration (%) | alkali molar ratio[2] |
| | acetate (g) | type | $R^1$ | n | $R^2$ | (g) | (g) | (g) | | | |
| PVA-15 | 2480 | POPMA | methyl | 24 | hydrogen | 201 | 0 | 0.8 | 3.0 | 20 | 17.5 | 0.015 |
| PVA-16 | 2282 | POPMA | methyl | 24 | hydrogen | 100 | 198 | 1.3 | 1.7 | 30 | 17.5 | 0.009 |
| PVA-17 | 2480 | POPMA | methyl | 24 | hydrogen | 60 | 238 | 0.4 | 2.8 | 20 | 17.5 | 0.01 |
| PVA-18 | 2480 | POPMA | methyl | 16 | hydrogen | 136 | 0 | 0.8 | 4.0 | 20 | 17.5 | 0.0085 |
| PVA-19 | 1125 | POPMA | methyl | 24 | hydrogen | 550 | 375 | 1.2 | 4.0 | 35 | 17.5 | 0.02 |
| PVA-20 | 1920 | POPMA | methyl | 16 | hydrogen | 80 | 480 | 6.0 | 3.5 | 40 | 17.5 | 0.009 |
| PVA-21 | 1500 | POPMA | methyl | 16 | hydrogen | 1500 | 0 | 18.6 | 4.0 | 70 | 17.5 | 0.02 |
| PVA-22 | 1860 | POPMA | methyl | 28 | hydrogen | 40 | 620 | 0.3 | 4.0 | 20 | 17.5 | 0.006 |
| PVA-23 | 1100 | POPVE | methyl | 33 | hydrogen | 320 | 900 | 10.5 | 4.0 | 60 | 17.5 | 0.02 |
| PVA-24 | 1984 | POPMA | methyl | 38 | hydrogen | 60 | 496 | 0.8 | 4.0 | 35 | 17.5 | 0.01 |
| PVA-25 | 940 | POPMA | methyl | 38 | hydrogen | 220 | 1060 | 10.0 | 4.0 | 50 | 17.5 | 0.02 |
| PVA-26 | 900 | POPMA | methyl | 38 | hydrogen | 600 | 1100 | 24.0 | 4.0 | 50 | 17.5 | 0.025 |
| PVA-27 | 1920 | POPVE | methyl | 48 | hydrogen | 70 | 480 | 4.2 | 4.0 | 50 | 17.5 | 0.004 |
| PVA-28 | 2480 | POBMA | ethyl | 20 | hydrogen | 50 | 480 | 1.4 | 3.5 | 40 | 17.5 | 0.009 |
| PVA-29 | 2480 | POPMA | methyl | 16 | hydrogen | 41 | 276 | 0.3 | 3.5 | 20 | 17.5 | 0.014 |
| PVA-30 | 1984 | POPMA | methyl | 24 | hydrogen | 7 | 496 | 1.7 | 4.0 | 35 | 17.5 | 0.02 |
| PVA-31 | 1984 | POPMA | methyl | 12 | hydrogen | 70 | 496 | 4.0 | 4.0 | 35 | 17.5 | 0.009 |
| PVA-32 | 1984 | POPMA | methyl | 15 | hydrogen | 120 | 496 | 4.0 | 4.0 | 35 | 17.5 | 0.025 |
| PVA-33 | 1425 | POPMA | methyl | 24 | hydrogen | 1600 | 75 | 0.9 | 4.0 | 35 | 17.5 | 0.009 |
| PVA-34 | 2160 | POPMA | methyl | 38 | hydrogen | 600 | 240 | 6.0 | 4.0 | 35 | 17.5 | 0.007 |
| PVA-35 | 1872 | POPVE | methyl | 48 | hydrogen | 350 | 528 | 7.8 | 4.0 | 50 | 17.5 | 0.009 |
| PVA-36 | 1920 | POPMA | methyl | 16 | hydrogen | 30 | 480 | 0.3 | 4.0 | 40 | 17.5 | 0.02 |
| PVA-37 | 2480 | POEMA | hydrogen | 8 | methyl | 56 | 0 | 0.5 | 5.0 | 20 | 17.5 | |

[1]POPMA: polyoxypropylene monoallyl ether,
POEMA: polyoxyethylene monoallyl ether,
POPVE: polyoxypropylene vinyl ether,
POBMA: polyoxybutylene monoallyl ether.
[2]alkali molar ratio; NaOH/VAc unit in PVAc (by mol).

TABLE 5

| | PVA Polymer | | | | | Aqueous Solution Viscosity (mPa·s)[1] | | | | | | | Viscosity Ratio[2] |
|---|---|---|---|---|---|---|---|---|---|---|---|---|---|
| | degree of modification[3] (mol %) | degree of saponification (mol %) | degree of polymerization | P × S | n | 5° C. | 10° C. | 20° C. | 30° C. | 40° C. | 50° C. | 60° C. | $\eta 1/\eta 2$ |
| PVA-15 | 0.2 | 98.5 | 2380 | 476 | 24 | 2050 | 1850 | 1420 | 982 | 3600 | 30200 | >$10^5$ | >28 |
| PVA-16 | 0.11 | 87.5 | 2340 | 257 | 24 | 1400 | 1100 | 876 | 696 | 1284 | 5100 | 15480 | 12 |
| PVA-17 | 0.06 | 92.5 | 2470 | 148 | 24 | 2000 | 1800 | 1084 | 700 | 580 | 782 | 1200 | 2.1 |
| PVA-18 | 0.18 | 83.6 | 2410 | 434 | 16 | 2200 | 1900 | 1116 | 726 | 664 | 870 | 2000 | 3.0 |
| PVA-19 | 1.2 | 98.5 | 540 | 648 | 24 | 34 | 29 | 22 | 14 | 1100 | 60000 | >$10^5$ | >91 |
| PVA-20 | 0.16 | 88.0 | 1540 | 246 | 16 | 270 | 230 | 160 | 100 | 112 | 123 | 136 | 1.2 |
| PVA-21 | 5.1 | 98.5 | 180 | 918 | 16 | 8 | 7 | 5 | 4 | 12 | 36 | 97 | 8.1 |
| PVA-22 | 0.042 | 79.6 | 1860 | 78 | 28 | 640 | 550 | 410 | 280 | 412 | 614 | 890 | 2.2 |
| PVA-23 | 0.51 | 98.5 | 860 | 439 | 33 | 105 | 91 | 70 | 47 | 9500 | >$10^5$ | >$10^5$ | >11 |
| PVA-24 | 0.047 | 93.0 | 1940 | 91 | 38 | 710 | 600 | 430 | 300 | 1050 | 3460 | 10500 | 10 |
| PVA-25 | 0.39 | 98.5 | 550 | 215 | 38 | 40 | 35 | 25 | 17 | 720 | 25300 | >$10^5$ | >139 |
| PVA-26 | 1.10 | 99.2 | 370 | 407 | 38 | 20 | 17 | 13 | 9 | 2370 | >$10^5$ | >$10^5$ | >42 |
| PVA-27 | 0.04 | 72.8 | 1930 | 77 | 48 | 680 | 580 | 430 | 300 | 1980 | 11700 | 62900 | 32 |
| PVA-28 | 0.08 | 90.6 | 1660 | 133 | 20 | 310 | 300 | 290 | 280 | 270 | 260 | 250 | 0.93 |
| PVA-29 | 0.069 | 97.8 | 2770 | 191 | 16 | 3000 | 2400 | 1588 | 1090 | 764 | 570 | 490 | 0.64 |
| PVA-30 | 0.009 | 98.5 | 2110 | 19 | 24 | 1530 | 1310 | 980 | 750 | 580 | 450 | 360 | 0.62 |
| PVA-31 | 0.16 | 88.0 | 1570 | 251 | 12 | 270 | 230 | 130 | 90 | 72 | 57 | 47 | 0.65 |
| PVA-32 | 0.23 | 99.2 | 1420 | 327 | 15 | 220 | 190 | 140 | 107 | 97 | 81 | 68 | 0.70 |
| PVA-33 | 3.2 | 88.0 | 310 | 992 | 24 | PVA did not completely dissolve in water, and a uniform aqueous solution thereof could not be formed. | | | | | | | |
| PVA-34 | 0.43 | 83.1 | 1260 | 542 | 38 | PVA did not completely dissolve in water, and a uniform aqueous solution thereof could not be formed. | | | | | | | |
| PVA-35 | 0.2 | 88.0 | 1820 | 364 | 48 | PVA did not completely dissolve in water, and a uniform aqueous solution thereof could not be formed. | | | | | | | |

TABLE 5-continued

| | PVA Polymer | | | | | | | | | | | |
|---|---|---|---|---|---|---|---|---|---|---|---|---|
| | degree of modification[3] (mol %) | degree of saponification (mol %) | degree of polymerization | P × S | n | \multicolumn{7}{c|}{Aqueous Solution Viscosity (mPa · s)[1]} | Viscosity Ratio[2] |
| | | | | | | 5° C. | 10° C. | 20° C. | 30° C. | 40° C. | 50° C. | 60° C. | η1/η2 |
| PVA-36 | 0.06 | 98.0 | 1770 | 106 | 16 | 360 | 308 | 272 | 200 | 160 | 132 | 102 | 0.63 |
| PVA-37 | 0.38 | 98.3 | 1760 | 669 | 8 | 630 | 500 | 358 | 236 | 174 | 97 | 68 | 0.39 |

[1] aqueous solution viscosity at concentration of 8% (measurement limit $10^5$ mPa · s).
[2] ratio of η1 of aqueous 8% solution measured with BL-type viscometer at 60° C. and 60 rpm to η2 thereof at 40° C. and 60 rpm.
[3] "degree of modification" means the polyoxyalkylene group-containing monomer unit content (mol %), relative to all monomer units, of the vinyl alcohol polymer

TABLE 6

| | Binder | | Inorganic Fine Particles | | | Concentration (%) |
|---|---|---|---|---|---|---|
| | PVA | part | Designation[1] | particle size (nm) | part | |
| Example 17 | PVA-15 | 20 | A-300 | 230 | 100 | 17 |
| Example 18 | PVA-16 | 20 | Aluminium Oxide C | 350 | 100 | 17 |
| Example 19 | PVA-15 | 10 | 4000C | 84 | 100 | 31 |
| Example 20 | PVA-16 | 25 | 733C | 253 | 100 | 21 |
| Example 21 | PVA-17 | 20 | A-300 | 230 | 100 | 17 |
| Example 22 | PVA-18 | 10 | 4000C | 84 | 100 | 31 |
| Example 23 | PVA-19 | 15 | 4000C | 84 | 100 | 35 |
| Example 24 | PVA-20 | 20 | A-300 | 230 | 100 | 17 |
| Example 25 | PVA-21 | 30 | 4000C | 84 | 100 | 35 |
| Example 26 | PVA-22 | 20 | MOX170 | 190 | 100 | 17 |
| Example 27 | PVA-23 | 15 | 4000C | 84 | 100 | 31 |
| Example 28 | PVA-24 | 10 | 4000C | 84 | 100 | 31 |
| Example 29 | PVA-25 | 20 | 4000C | 84 | 100 | 35 |
| Example 30 | PVA-26 | 30 | Aluminium Oxide C | 350 | 100 | 20 |
| Example 31 | PVA-27 | 10 | SN20L | 45 | 100 | 18 |
| Example 32 | PVA-28 | 20 | 4000C | 84 | 100 | 31 |
| Example 33 | PVA-1 | 20 | A-300 | 650 | 100 | 17 |

| | Viscosity of Coating Liquid (mPa · s) | | | | | Coating Temp. (° C.) | Drying Temp. (° C.) | Physical Properties of Coating Layer | | | |
|---|---|---|---|---|---|---|---|---|---|---|---|
| | 20° C. | 30° C. | 40° C. | 50° C. | 60° C. | | | cracking | glossiness | transmittance (%) | ink absorption |
| Example 17 | 110 | 85 | 130 | 1000 | 2100 | 40 | 95 | A | 48 | 53 | A |
| Example 18 | 100 | 80 | 57 | 60 | 75 | 50 | 100 | A | 39 | — | A |
| Example 19 | 580 | 270 | 170 | 330 | 500 | 40 | 100 | A | 90 | 81 | A |
| Example 20 | 120 | 90 | 72 | 110 | 210 | 40 | 55 | B | 26 | — | A |
| Example 21 | 110 | 85 | 100 | 160 | 220 | 40 | 100 | A | 22 | 38 | A |
| Example 22 | 550 | 275 | 150 | 170 | 220 | 40 | 100 | B | 36 | 29 | A |
| Example 23 | 54 | 33 | 20 | 29 | 44 | 40 | 100 | A | 77 | 78 | A |
| Example 24 | 95 | 60 | 33 | 36 | 40 | 40 | 100 | B | 49 | 54 | B |
| Example 25 | 290 | 145 | 85 | 115 | 170 | 40 | 100 | B | 56 | 76 | C |
| Example 26 | 180 | 100 | 55 | 60 | 68 | 40 | 100 | A | 15 | 21 | A |
| Example 27 | 170 | 76 | 43 | 70 | 130 | 5 | 50 | B | 89 | 80 | A |
| Example 28 | 240 | 130 | 70 | 85 | 110 | 60 | 100 | A | 42 | 31 | B |
| Example 29 | 300 | 160 | 80 | 115 | 190 | 40 | 100 | A | 76 | 81 | A |
| Example 30 | 430 | 350 | 980 | 3200 | 10100 | 40 | 100 | A | 42 | 51 | A |
| Example 31 | 23 | 18 | 12 | 19 | 25 | 40 | 100 | B | 85 | 92 | C |
| Example 32 | 210 | 196 | 190 | 186 | 180 | 40 | 100 | B | 25 | 8 | B |
| Example 33 | 90 | 70 | 100 | 950 | 1900 | 40 | 95 | A | 9 | 3 | B |

[1] A-300: Aerosil A-300 (by Nippon Aerosil). Aluminium Oxide C: aluminium oxide C (by Nippon Aerosil). SN20L: colloidal silica (by Nissan Chemical). MOX170: Aerosil MOX170 (by Nippon Aerosil). 4000C: Sylojet 4000C (by Grace). 733C: Sylojet 733C (by Grace).

TABLE 7

| | Binder | | Inorganic Fine Particles | | | Concentration (%) |
|---|---|---|---|---|---|---|
| | PVA | part | Designation[1] | particle size (nm) | part | |
| Comp. Ex. 6 | PVA-29 | 20 | Aluminium Oxide C | 350 | 100 | 17 |
| Comp. Ex. 7 | PVA-30 | 20 | Aluminium Oxide C | 350 | 100 | 17 |
| Comp. Ex. 8 | PVA-31 | 20 | Aluminium Oxide C | 350 | 100 | 17 |

TABLE 7-continued

| | | | | | | | |
|---|---|---|---|---|---|---|---|
| Comp. Ex. 9 | PVA-32 | 20 | Aluminium Oxide C | | 350 | 100 | 17 |
| Comp. Ex. 10 | PVA-33 | 20 | A-300 | | 230 | 100 | 17 |
| Comp. Ex. 11 | PVA-34 | 20 | A-300 | | 230 | 100 | 17 |
| Comp. Ex. 12 | PVA-35 | 20 | A-300 | | 230 | 100 | 17 |
| Comp. Ex. 13 | PVA-36 | 10 | 4000C | | 84 | 100 | 31 |
| Comp. Ex. 14 | PVA-37 | 10 | 4000C | | 84 | 100 | 31 |

| | Viscosity of Coating Liquid (mPa · s) | | | | | Coating Temp. (° C.) | Drying Temp. (° C.) | Physical Properties of Coating Layer | | | |
|---|---|---|---|---|---|---|---|---|---|---|---|
| | 20° C. | 30° C. | 40° C. | 50° C. | 60° C. | | | cracking | glossiness | transmittance (%) | ink absorption |
| Comp. Ex. 6 | 110 | 86 | 64 | 50 | 40 | 40 | 100 | C | 28 | 30 | B |
| Comp. Ex. 7 | 100 | 78 | 58 | 45 | 38 | 40 | 100 | C | 22 | 23 | B |
| Comp. Ex. 8 | 75 | 55 | 40 | 31 | 27 | 40 | 100 | C | 25 | 28 | B |
| Comp. Ex. 9 | 70 | 48 | 33 | 30 | 28 | 40 | 100 | C | 19 | 22 | B |
| Comp. Ex. 10 | PVA did not completely dissolve in water, and a uniform coating liquid could not be prepared. | | | | | | | | | | |
| Comp. Ex. 11 | PVA did not completely dissolve in water, and a uniform coating liquid could not be prepared. | | | | | | | | | | |
| Comp. Ex. 12 | PVA did not completely dissolve in water, and a uniform coating liquid could not be prepared. | | | | | | | | | | |
| Comp. Ex. 13 | 77 | 48 | 31 | 23 | 18 | 40 | 100 | C | 4 | 10 | C |
| Comp. Ex. 14 | 92 | 55 | 40 | 35 | 27 | 40 | 110 | C | 65 | 15 | D |

[1])A-300: Aerosil A-300 (by Nippon Aerosil). Aluminium Oxide C: aluminium oxide C (by Nippon Aerosil). 4000C: Sylojet 4000C (by Grace). 733C: Sylojet 773C (by Grace).

In Table 4 and Table 5, PVA-15 to PVA-28 are vinyl alcohol polymers that have polyoxyalkylene group-containing monomer units of formula (I) where $R^1$ is an alkyl group having 1 or 2 carbon atoms, $R^2$ is a hydrogen atom; and when the viscosity of an aqueous 8 wt. % solution of the vinyl alcohol polymer is measured with a BL-type viscometer at a rotor speed of 60 rpm, then the ratio of the viscosity η1 thereof at 60° C. to the viscosity η2 thereof at 40° C. η1/η2 is at least 0.8; and the product of the viscosity-average degree of polymerization P of the vinyl alcohol polymer and the polyoxyalkylene group-containing monomer unit content S (mol %), relative to all monomer units, of the vinyl alcohol polymer, P×S, and the number n of the oxyalkylene repeating units in the polyoxyalkylene group-containing monomer unit satisfy the following numerical formulae (1) to (4):

$$n > -0.047 P \times S + 25 \quad (1),$$

$$n < -0.044 P \times S + 58 \quad (2),$$

$$P \times S > 5 \quad (3)$$

$$15 < n \leq 50 \quad (4).$$

Accordingly, they are within the scope of the vinyl alcohol polymer of the invention.

On the other hand, PVA-29 to PVA-32 and PVA-36 are vinyl alcohol polymers that have polyoxyalkylene group-containing monomer units of formula (I) where $R^1$ is an alkyl group having from 1 or 2 carbon atoms and $R^2$ is a hydrogen atom; but they do not satisfy the above-mentioned numerical formula (1) or (4), and the viscosity ratio η1/η2 of the aqueous solution of the polymer was smaller than 0.8. In addition, PVA-33 to PVA-35, not satisfying the numerical formula (2), do not completely dissolve in water and could not form an uniform aqueous solution.

From the results in Table 6, it is understood that, when the vinyl alcohol polymer of the invention is used as the filler binder in the ink-receiving layer of an inkjet recording material, then the ink-receiving layer does not crack, is glossy and transparent and absorbs ink well (Examples 17 to 33).

On the other hand, the vinyl alcohol polymers not satisfying the numerical formula (1) or (4) could not satisfy the necessary physical properties of surface cracking resistance, glossiness, ink absorbability and transparency (Comparative Examples 6 to 9 and 13). In addition, the vinyl alcohol polymers not satisfying the numerical formula (2) could not completely dissolve in water and therefore could not form an uniform coating liquid (Comparative Examples 10 to 12).

When a coating liquid that contains the vinyl alcohol polymer of the invention is used for the ink-receiving layer or the glossy layer of an inkjet recording material, then the layer does not crack and is highly glossy even when it is not cooled after formation and only is dried at a temperature higher than the coating temperature. Accordingly, the invention has made it possible to fabricate glossy inkjet recording materials even in ordinary coating lines not equipped with any additional cooling zone equipment, and the production speed, or that is, the producibility of such inkjet recording materials according to the invention is extremely high and utility costs such as the power consumption may be greatly reduced.

The present application is based on Japanese Patent Application JP 277792/2003, filed Jul. 22, 2003 in the Japanese Patent Office, the entire contents of which are hereby incorporated by reference.

The invention claimed is:

1. A vinyl alcohol polymer comprising units from a polyoxyalkylene group-containing monomer of the following formula (I):

wherein $R^1$ represents an alkyl group having 1 or 2 carbon atoms; $R^2$ represents a hydrogen atom, or an alkyl group having from 1 to 4 carbon atoms, wherein:
when the viscosity of an aqueous 8 wt. % solution of the vinyl alcohol polymer is measured with a BL-type viscometer at a rotor speed of 60 rpm, the ratio of the viscosity η1 thereof at 60° C. to the viscosity η2 thereof at 40° C., η1/η2 is at least 0.8;

when $R^2$ is a hydrogen atom, then a product of the viscosity-average degree of polymerization P, of the vinyl alcohol polymer and a content S (mol %), of polyoxyalkylene group-containing monomer units relative to all monomer units of the vinyl alcohol polymer, P×S, and a number n of the oxyalkylene repeating units in the polyoxyalkylene group-containing monomer unit satisfies the following numerical formulae (1) to (4):

$$n > -0.047 P \times S + 25 \quad (1),$$

$$n < -0.044 P \times S + 58 \quad (2),$$

$$P \times S > 5 \quad (3),$$

$$15 < n \leq 50 \quad (4);$$

when $R^2$ is an alkyl group having from 1 to 4 carbon atoms, then the number n of oxyalkylene repeating units in the polyoxyalkylene group-containing monomer unit satisfies the following numerical formula (5):

$$1 \leq n \leq 100 \quad (5).$$

2. The vinyl alcohol polymer as claimed in claim 1, wherein the ratio of viscosity η1 thereof at 60° C. to the viscosity η2 thereof at 40° C., η1/η2 is at least 1.0.

3. The vinyl alcohol polymer as claimed in claim 1, wherein $R^1$ is a methyl group and $R^2$ is an alkyl group having from 1 to 4 carbon atoms.

4. The vinyl alcohol polymer as claimed in claim 1, wherein $R^1$ is a methyl or ethyl group and $R^2$ is a methyl or butyl group.

5. The vinyl alcohol polymer as claimed in claim 1, wherein $R^1$ is a methyl group and $R^2$ is a hydrogen atom.

6. The vinyl alcohol polymer as claimed in claim 1, wherein $R^1$ is a methyl group and $R^2$ is a methyl group.

7. The vinyl alcohol polymer as claimed in claim 1, wherein when $R^2$ is an alkyl group having from 1 to 4 carbon atoms, then P×S, and n satisfy the following numerical formulae (6) to (8):

$$n > -0.047 P \times S + 15 \quad (6),$$

$$n < -0.044 P \times S + 58 \quad (7),$$

$$P \times S > 5 \quad (8).$$

8. The vinyl alcohol polymer as claimed in claim 1, wherein S is 0.01 to 10 mol %.

9. The vinyl alcohol polymer as claimed in claim 1, wherein S is 0.03 to 5 mol %.

10. The vinyl alcohol polymer as claimed in claim 1, wherein S is 0.05 to 0.5 mol %.

11. The vinyl alcohol polymer as claimed in claim 1, wherein P is 50 to 10,000.

12. The vinyl alcohol polymer as claimed in claim 1, wherein P is 100 to 8,000.

13. The vinyl alcohol polymer as claimed in claim 1, wherein P is 300 to 5,000.

14. A method for producing a vinyl alcohol polymer of claim 1, comprising:

saponifying a polyvinyl ester obtained through copolymerization of a polyoxyalkylene group-containing monomer of the following formula (II) and a vinyl ester monomer:

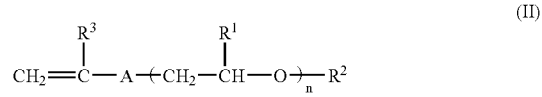

(II)

wherein $R^1$ represents an alkyl group having 1 or 2 carbon atoms; $R^2$ represents a hydrogen atom, or an alkyl group having from 1 to 4 carbon atoms; $R^3$ represents a hydrogen atom or a methyl group; A represents a divalent linking group.

15. The method of claim 14, wherein A is a divalent linking group selected from the group consisting of carbonyloxy, carbonylimino, oxy and alkyleneoxy groups.

16. The method of claim 14, wherein $R^1$ is a methyl group, $R^2$ is a hydrogen atom and A is a methyleneoxy group.

17. The method of claim 14, wherein $R^1$ is a methyl group and A is a methyleneoxy group.

18. A coating agent that comprising the vinyl alcohol polymer of claim 1 in a form suitable for forming a coating on a substrate.

19. A coated article comprising a substrate on which is coated the coating agent of claim 18.

20. The coated article of claim 19, wherein the article is an inkjet recording material.

* * * * *